US007215832B1

(12) United States Patent
Yamaguchi

(10) Patent No.: US 7,215,832 B1
(45) Date of Patent: May 8, 2007

(54) RETRIEVAL SYSTEM AND IMAGE PROCESSING APPARATUS

(75) Inventor: Hiroshi Yamaguchi, Kanagawa (JP)

(73) Assignee: Fujifilm Corporation, Kanagawa (JP)

( * ) Notice: Subject to any disclaimer, the term of this patent is extended or adjusted under 35 U.S.C. 154(b) by 0 days.

(21) Appl. No.: 09/448,301

(22) Filed: Nov. 24, 1999

(30) Foreign Application Priority Data

Nov. 25, 1998 (JP) .................................. 10-333602

(51) Int. Cl.
G06K 9/54 (2006.01)
(52) U.S. Cl. ....................................... 382/305; 382/232
(58) Field of Classification Search ................ 382/232, 382/209, 224, 270, 273, 261, 266, 268, 195, 382/293, 295, 305; 235/492; 358/426.11; 375/240.24
See application file for complete search history.

(56) References Cited

U.S. PATENT DOCUMENTS

| 4,974,071 | A | * | 11/1990 | Maeda .................... 358/539 |
| 5,229,864 | A | * | 7/1993 | Moronaga et al. .......... 382/261 |
| 5,251,020 | A | * | 10/1993 | Sugiyama .................. 358/500 |
| 5,359,438 | A | * | 10/1994 | Maeda .................... 358/539 |
| 5,748,780 | A | * | 5/1998 | Stolfo ..................... 382/232 |
| 5,892,546 | A | | 4/1999 | Hirabayashi et al. ..... 348/394.1 |
| 5,911,006 | A | * | 6/1999 | Funamoto et al. .......... 382/232 |
| 5,915,038 | A | * | 6/1999 | Abdel-Mottaleb et al. .. 382/209 |
| 5,940,824 | A | * | 8/1999 | Takahashi ..................... 707/6 |
| 5,959,675 | A | * | 9/1999 | Mita et al. ............. 375/240.04 |
| 6,058,225 | A | * | 5/2000 | Mori et al. ................ 382/321 |

(Continued)

FOREIGN PATENT DOCUMENTS

JP 404291881 A * 10/1992

(Continued)

OTHER PUBLICATIONS

Inohara et al., "Retrieval Method of Textile Pictures Database Using a Complexity Scale", IEEE, 1993, pp. 699-702.*

(Continued)

*Primary Examiner*—Anh Hong Do
(74) *Attorney, Agent, or Firm*—Birch, Stewart, Kolasch & Birch, LLP

(57) ABSTRACT

The retrieval system includes a storage device for storing compressed image data of the image of interest and a retrieval device for retrieving the image while the compressed image data is in a compressed state, and preferably further includes a compression device for compressing image data of the image to produce the compressed image data. More preferably, the storage device stores the compressed image data of the image and information of the image under a correspondence therebetween. Further preferably, the information of a corresponding image is read from the data base in accordance with a result retrieved by the retrieval device. The image processing apparatus includes the retrieval system, a setting device for setting image processing in accordance with the information of the image and an image processing image device for performing the set image processing on the image or the image data thereof. The retrieving system is able to retrieve image-related information such as the information of the image data or the image processing from the data base and also the image processing apparatus is able to achieve a coincidence in color and density between the simultaneous print and the reprint by utilizing the retrieving system.

21 Claims, 6 Drawing Sheets

U.S. PATENT DOCUMENTS

| | | | |
|---|---|---|---|
| 6,064,427 A | 5/2000 | Shiota et al. | 348/96 |
| 6,192,166 B1* | 2/2001 | Mori et al. | 382/312 |
| 6,244,514 B1* | 6/2001 | Otto | 235/492 |

FOREIGN PATENT DOCUMENTS

| | | |
|---|---|---|
| JP | 5-46683 A | 2/1993 |
| JP | 7-336723 A | 12/1995 |
| JP | 8-305718 A | 11/1996 |
| JP | 10-215356 A | 8/1998 |

OTHER PUBLICATIONS

Kato et al., "A Sketch Retrieval Method for Full Color Image Database", IEEE 1992, pp. 530-533.*

Herrmann et al., "Retrieval of Document Images Using Layout Knowledge", IEEE 1993, pp. 537-540.*

Hanano, "A Similarity Retrieval Method for Imnage Database Using Simple Graphics", IEEE 1988, pp. 149-154.*

* cited by examiner

FIG. 3

RETRIEVAL SYSTEM AND IMAGE PROCESSING APPARATUS

BACKGROUND OF THE INVENTION

The present invention relates to the technical field of a retrieval system which retrieves an image, image data thereof and image processing information of the image from data base and also to the technical field of an image processing apparatus which is capable of outputting a reprint which appropriately reproduces an image of a simultaneous print utilizing the retrieval system in a photographic printing system or the like.

Heretofore, the images recorded on photographic films such as negative films and reversal films (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to product image data for recording purposes; recording light that has been modulated in accordance with the image data is used to scan and expose a light-sensitive material to record a latent image, which is subsequently developed to produce a (finished) print. The printer operating on this principle has been commercialized as a digital photoprinter.

In the digital printer, images can be processed as digital image data to determine the exposure conditions for printing. Hence, it is capable of performing various image processing operations such as the correction of washed-out highlights or flat (dull) shadows due to the taking of pictures with backlight or an electronic flash, sharpening and the correction of color or density failures and this enables the production of prints of high quality that has been impossible to achieve by the conventional direct exposure. Further, not only the assembling of images and the splitting of a single image into plural images but also the composition of characters can be performed by processing the image data and, as a result, prints can be outputted after various editing and/or processing operations have been performed in accordance with specific uses.

The digital printer is not limited to the above capability; the image recorded with a digital camera or the like can be outputted as a print; the image is not only outputted as a print, but also can be converted to image data which is then supplied into a computer or the like and/or stored in recording media such as a floppy disk and the like; hence, the image data can be put to various non-photographic uses.

The digital photoprinter having such features basically comprises a scanner (image reading apparatus) for reading an image recorded on the film photoelectrically by projecting a reading light to a film and reading its projection light, an image processing apparatus for carrying out a specified image processing on an image data read by the scanner or an image data supplied from a digital camera or the like so as to obtain an output image data for image recording, that is, exposure condition, a printer (image recording apparatus) for recording the image as a latent image by exposing a light-sensitive material by, for example, scanning with light beam corresponding to an image data outputted from the image processing apparatus, and a processor (developing apparatus) for carrying out development processing on the light-sensitive material exposed by the printer so as to produce a (finished) photographic print in which the image is reproduced.

In the photographic print which is outputted from not only such digital photoprinter, but also the image recorded on the film and the image data recorded with the digital camera, an opportunity often occurs in which the image (frame) printed once is outputted again as a reprint, namely, reprinting is performed in accordance with a request for the extra printing or the like.

In this case, if an instruction for correction is not particularly given, it is demanded that color and density of the image coincide with a previously outputted print (usually, the print outputted at the time of the simultaneous printing that is carried simultaneously with developing the photographed film). In practice, however, a case often occurs in which the color and density of the image differ between the preceding print and the reprint because of an error in judgment or operation of an operator so that many a complaint from a customer is often heard.

SUMMARY OF THE INVENTION

Accordingly, a first object of the present invention is to solve the problems of the prior arts and to provide a retrieving system which can easily render image data of an image and information of image processing thereof to a database, retrieve information related to the image such as the image itself, image data thereof, information of image processing of the image in a simple and rapid way and is advantageously utilized in an image processing apparatus such as a photographic printing system or the like.

A second object of the present invention is to solve the problems of the prior arts and to provide an image processing apparatus for use in a printing system that outputs a print in which an image recorded on a photographic film or an image recorded with a digital camera or the like is reproduced, the image processing apparatus being capable of stably and constantly reproducing an image whose color and density are equal to a previous print on a reprint in accordance with a request or the like of the extra prints.

The first object of the present invention can be attained by a retrieval system for retrieving an image from data base, comprising: a storage device for storing compressed image data of the image; and a retrieval device for retrieving the image while the compressed image data is in a compressed state.

The retrieval system of the present invention further comprises a compression device for compressing image data of the image to produce the compressed image data.

Preferably, the storage device stores the compressed image data of the image and information of the image under a correspondence therebetween.

Preferably, the information of a corresponding image is read from the data base in accordance with a result retrieved by the retrieval device.

Moreover, an image processing apparatus of the present invention comprises an image processing device for subjecting image or image data thereof to image processing;

a setting device for setting the image processing which the image processing device performs in accordance with the image or the image data thereof;

a storage device for storing compressed image data of the image or the image data thereof and information of the image processing to which the image or the image data thereof corresponding to the compressed image data is subjected under a correspondence therebetween; and a retrieval device for retrieving the image stored in the storing device while the compressed image data is in a compressed state to read the information of the image processing corresponding to the image of interest.

The image processing apparatus further comprises a compression device for compressing the image data of the image to produce the compressed image data.

Preferably, when the information of the image processing corresponding to the image retrieved by the retrieval device is read out in accordance with an instruction for reprocessing the image or the image data thereof, the setting device reproduces the image processing to which the image or the image data thereof has previously been subjected using the thus read information of the image processing.

Preferably, in the above aspects, the compression device performs normalization of image data prior to compression of the image data of the image.

Preferably, the storage device stores image data of the image after the image is split into a plurality of regions and the retrieval device performs retrieval of the compressed image data after the image data in regions which are in a point symmetry relation with each other about the center of said image are unified.

Preferably, the compressed image data comprises spatial coefficients of a luminance signal and a color difference signal.

Preferably, the retrieval device performs at least one of retrieval by comparing the spatial coefficients of the luminance signal up to a specified order with each other to select objects to be retrieved and thereafter by comparing the spatial coefficients of the color difference signal of the thus selected objects to be retrieved to another specified order with each other, and retrieval by comparing the spatial coefficients of the luminance signal up to a higher order than the previously specified order with each other.

Preferably, the retrieval device performs priority ranking of the compressed image data to be candidates.

Preferably, after the compressed image data is extended, one or more images are represented as visible images in accordance with the result of the priority ranking.

Preferably, information of the image is at least one of image data of the image of interest and information of image processing to which the image of interest is subjected.

BRIEF DESCRIPTION OF THE DRAWINGS

FIG. 3 is a block diagram showing an embodiment of the image processing apparatus of the digital photoprinter shown in FIG. 1;

DETAILED DESCRIPTION OF THE INVENTION

Hereinafter, a retrieval system and an image processing apparatus of the invention will now be described in detail with reference to the preferred embodiments shown in the accompanying drawings.

Figure 1:
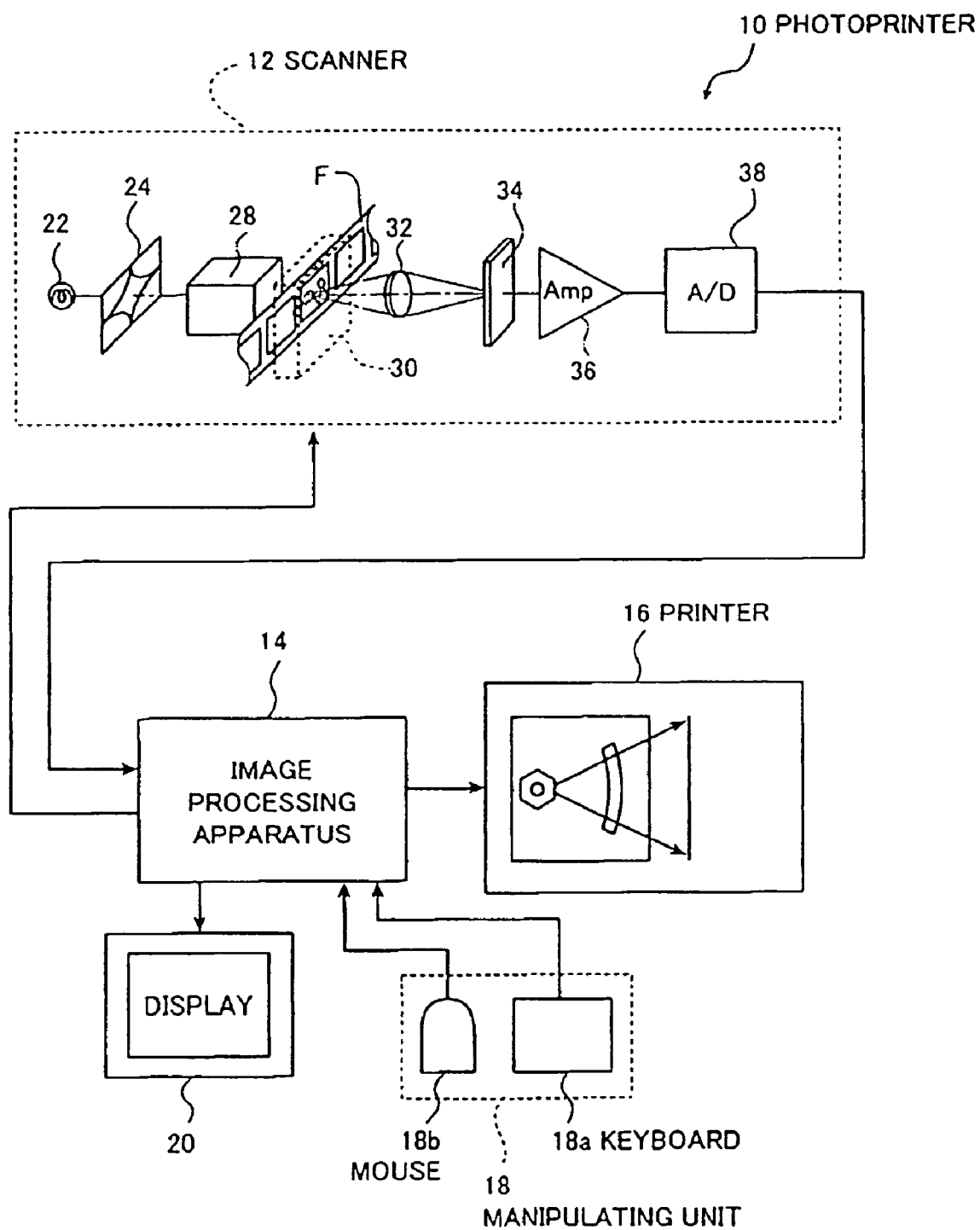
FIG. 1 is a block diagram showing an embodiment of a digital photoprinter using an image processing apparatus of the present invention.

FIG. 1 is a block diagram showing an embodiment of a digital photoprinter using an image processing apparatus which utilizes a retrieval system of the invention.

The digital photoprinter (hereinafter referred to as photoprinter) 10 shown in FIG. 1 basically comprises a scanner (image reading apparatus) 12 for reading an image recorded on a film F photoelectrically, an image processing apparatus 14 for carrying out image processing on the read image data (image information) and manipulating and controlling the photoprinter 10 as a whole, and a printer 16 for exposing a light-sensitive material (photographic paper) with light beams modulated in accordance with the image data outputted from the image processing apparatus 14 and carrying out development processing to output a (finished) print.

A manipulating unit 18 having a key board 18a and a mouse 18b for inputting (setting) various conditions, a selection and instruction of a processing, an instruction of specific color/density correction and the like and a display 20 for displaying an image read by the scanner 12, various control pictures for setting or registering various operating instructions, conditions and the like are connected to the image processing apparatus 14.

The scanner 12 reads an image recorded on the film F or the like one frame by one frame photoelectrically, and comprises a light source 22, a variable diaphragm 24, a diffusion box 28 for diffusing a reading beam incident on the film F so that it becomes uniform across the plane of the film F, a focusing lens unit 32, an image sensor 34 having line CCD sensors corresponding to respective image reading for R (red), G (green) and B (blue), an amplifier (Amp) 36 and an A/D (analog/digital) converter 38.

In the photoprinter 10, dedicated carriers mountable to the main body of the scanner 12 is prepared depending on the kind of film such as a negative film (or reversal film) of Advanced Photo System (APS) and 135 size, and film type such as stripes, slide and the like. By replacing the carrier, this can meet various films and processing. An image (frame) recorded on the film and supplied for print production is transported to a specific reading position by this carrier.

When such scanner 12 reads an image recorded on the film F, a reading light emitted from the light source 22 and adjusted in terms of light amount by the variable diaphragm 24 is incident on (the corresponding frame of) the film F located at a specified reading position by the carrier and passes therethrough to obtain a projection light carrying the image recorded on the film F.

Figure 2A:
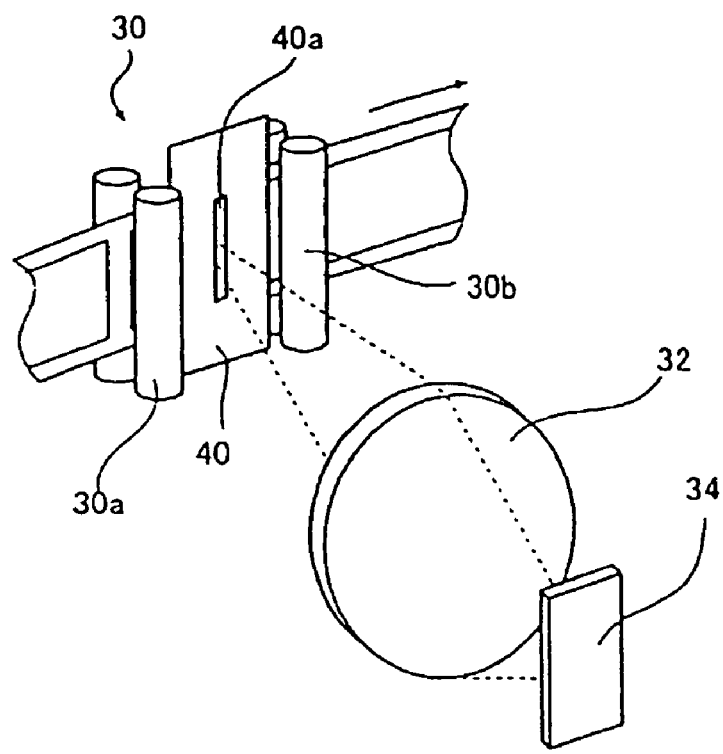
FIG. 2A is a schematic view of a scanner to be mounted on the digital photoprinter shown in FIG. 1.

As shown schematically in FIG. 2A, the illustrated carrier 30 has a pair of transport roller pairs 30a and 30b and a mask 40 having a slit 40a. The transport roller pairs 30a and 30b are provided on opposite sides of the specified reading position in an auxiliary scanning direction which is perpendicular to the direction in which the line CCD sensors in the image sensor 34 extend (i.e., the main scanning direction) and they transport the film F with its length being parallel to the auxiliary scanning direction as it is in registry with the reading position. The slit 40*a* defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40*a* extending in the main scanning direction, whereupon the image of each frame recorded on the film F is read.

Such carrier 30 is provided with a bar code reader, a optical sensor or the like for reading a bar code such as a DX code, an extended DX code, an FNS code or the like optically recorded on the film and a print format from the image recorded on the film F.

As is well known, magnetic recording media is formed on a film of the Advanced Photo System and the carrier meeting the film (cartridge) of this Advanced Photo System contains a magnetic head 42 for reading information recorded on these magnetic recording media and recording necessary information thereon.

As described above, the reading light passes through the film F carried by the carrier 30 so that it becomes a projection light bearing an image. This projection light is focused on a light receiving surface of the image sensor 34 by the focusing lens unit 32.

Figure 2B:
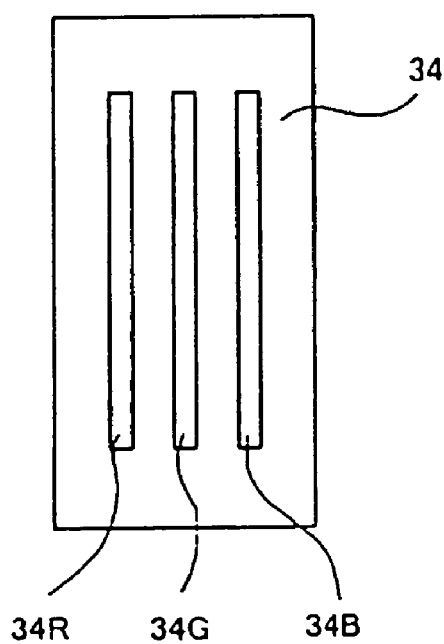
FIG. 2B is a schematic view of an image sensor allocated to the digital photoprinter shown in FIG. 1.

As shown in FIG. 2B, the image sensor 34 is a so-called 3-line color CCD sensor having a line CCD sensor 34R for reading red image, a line CCD sensor 34G for reading green image, and a line CCD sensor 34B for reading blue image. Those line CCD sensors are extended in the main scanning direction as described above. The projection light of the film F is separated to three primary colors, red, green and blue by this image sensor 34 and read photoelectrically.

An output signal of the image sensor 34 is amplified by an amplifier 36, converted to digital signal by an A/D converter 38 and sent to the image processing apparatus 14.

In the scanner 12, the images recorded on the film F are captured by two scans, the first being prescan of reading at a low resolution and the second being fine scan for obtaining output image data of an output image.

The prescan is performed at a preliminary set prescan reading condition which ensures that the images on all films which the scanner 12 is about to read can be read without saturating the image sensor 34. On the other hand, the fine scan is performed at fine scan reading condition for each frame, which is set by the prescanned data so that the image sensor 34 is saturated by a density slightly lower than the minimum density of the image (frame) of interest.

Therefore, output signals of the prescan and fine scan have different resolution and output level although the same image is scanned.

According to the present invention, the scanner is not restricted to a type by slit scanning, but may be a type employing an areal exposure for reading an entire area of a single image all at once. In this case, for example, an area CCD sensor is employed. Filter insertion device for red, green and blue color filters are provided between the light source and film F, and color filters are inserted therein. Reading of an image by the area CCD sensors are carried out by inserting alternately the red, green and blue color filters in succession so that an image recorded on the film is separated to three primary colors.

In the printer 10 of the present invention, in addition to the image on the film F read by the scanner 12, it is permissible to produce a print by reproducing an image from image data sent from various image data supply sources such as various image reading unit, image pickup unit, image data storage unit and the like, namely, an image reading apparatus for reading an image or a reflection original, image pickup device such as digital camera, digital video camera and the like, communication device such as LAN (local area network), computer communication network and the like, various media (recording media) such as memory card (PC card), MO (magneto-optic recording media), photo CD and the like.

As described above, an output signal (output image data) from the scanner 12 is outputted to the image processing apparatus 14.

Figure 3:
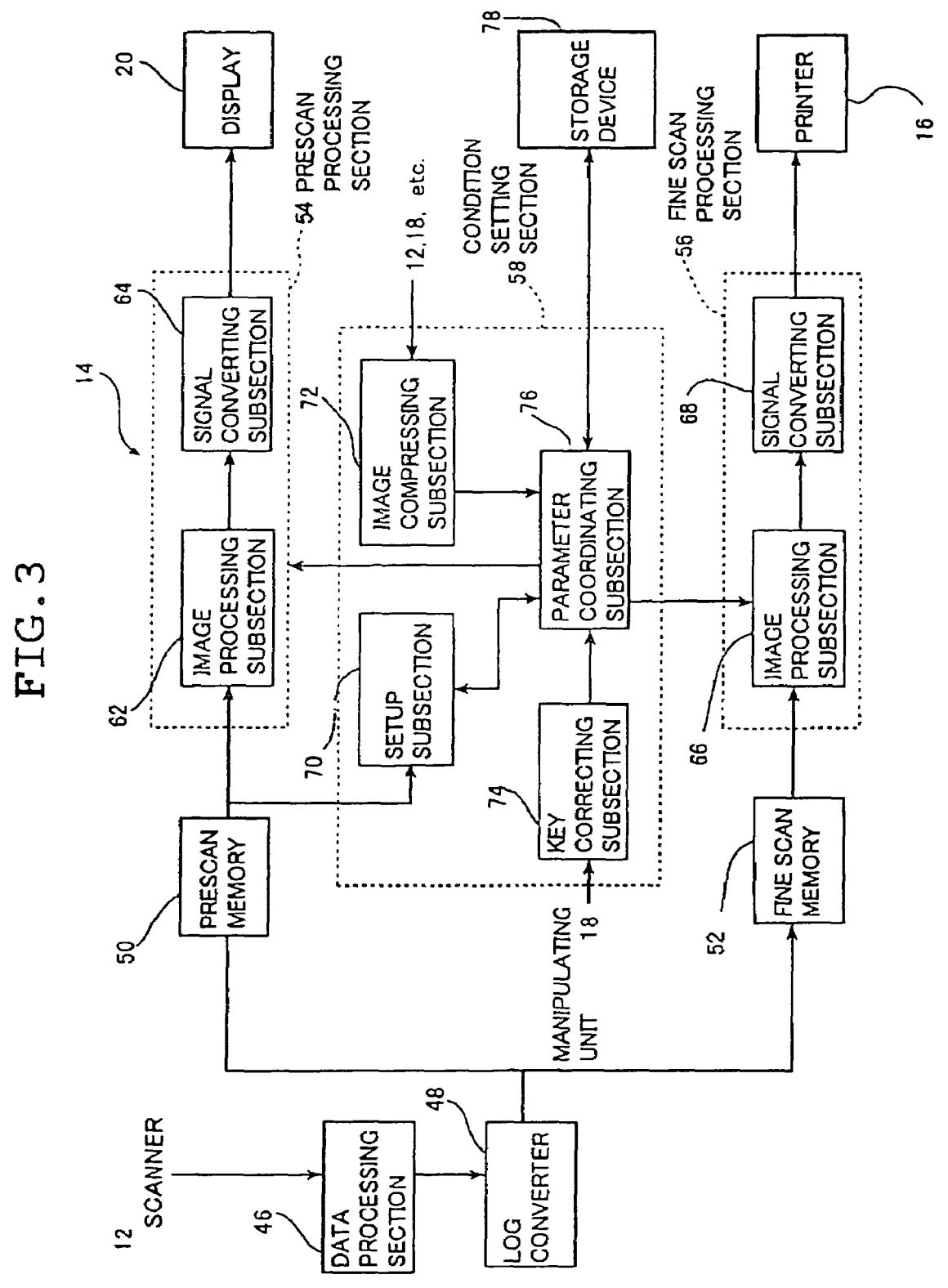

FIG. 3 shows a block diagram of the image processing apparatus 14. As shown in FIG. 3, the image processing apparatus (hereinafter referred to as processing apparatus) 14 comprises a data processing section 46, a log converter 48, a prescan (frame) memory 50, a fine scan (frame) memory 52, a prescan processing section 54, a fine scan processing section 56 and a condition setting section 58.

FIG. 3 shows mainly sites relating to the image processing. In addition to the components shown here, the image processing apparatus 14 contains a CPU for controlling the entire photoprinter 10 including the image processing apparatus 14, a memory for storing information necessary for operation of the photoprinter 10, device of determining a stop value (e.g. F-number) of the variable diaphragm 24 and storage time of CCD sensor 34 and the like. A manipulating unit 18 and a display 20 are connected to respective sites through this CPU (CPU bus) and the like.

Respective output signals for red, green and blue outputted from the scanner 12 are subjected to predetermined processing for DC offset correction, darkness correction, shading correction and the like by the data processing section 46 and converted to digital image data by the log converter 48. Prescanned (image) data is stored in the prescan memory 50 and fine scanned (image) data is stored in the fine scan memory 52.

When the print is produced using the image data sent from the image data supply sources such as the digital camera and the like other than the scanner 12, for example, the thus supplied data is converted by the data processing section 46 to produce image data adaptable to the photoprinter 10 (image processing apparatus 14).

The prescanned data stored in the prescan memory 50 is processed by a prescan processing section 54 and the fine scanned data stored in the fine scan memory 52 is processed by a fine scan processing section 56.

Here, the prescan processing section 54 comprises an image processing subsection 62 and a signal converting subsection 64. The fine scan processing section 56 comprises an image processing subsection 66 and a signal converting subsection 68.

The image processing subsection 62 (hereinafter referred to as processing subsection 62) of the prescan processing section 54 and the image processing subsection 66 (hereinafter referred to as processing subsection 66) of the fine scan processing section 56 are sites where images (image data) read by the scanner 12 are subjected to image processing in accordance with the setting of the condition setting section 58 which will be described in detail later. Basically both processing subsections 62 and 66 carry out the same image processing except that the pixel density of image data to be processed is different.

As the image processing performed at the processing subsections 62 and 66, one or more of gray balance adjustment, tone (gradation) adjustment, density adjustment, geometrical distortion correction, marginal light quantity correction, sharpness processing (sharpening), dodging processing, electronic magnification, special finishing such as soft focus finishing, sepiatone finishing and monochrome finishing, red eye correction and known various image processing are exemplified.

These corrections may be executed according to a known method and ordinarily, processing computation, processing by LUT (lookup table), matrix (MTX) computation, processing by low pass filter (LPF) and the like are combined appropriately.

If taking an example, for gray balance adjustment, density adjustment and tone adjustment, a method using LUT produced in accordance with the image characteristic quantity is exemplified. Usually, the correction tables are produced for each of red, green and blue colors.

For saturation adjustment, a method by MTX computation is exemplified.

For sharpness processing, a method in which an image is divided to three frequency components, that is, low, intermediate and high frequency components, luminance signals obtained from the intermediate and high frequency components are multiplied with sharpness gains (sharpness correction coefficients), respectively and then the resultant luminance information is added to the low frequency component is exemplified.

The signal converting subsection 64 of the prescan processing section 54 converts image data processed by the processing subsection 62 by means of 3D-(three-dimensional) LUT so as to obtain image data corresponding to a representation on the display 20.

On the other hand, the signal converting subsection 68 of the fine scan processing section 56 converts image data processed by the processing subsection 66 by means of 3D-(three-dimensional) LUT or the like so as to obtain output image data corresponding to image recording by the printer 16 and supplies the obtained output image data to the printer 16. The printer 16 scans a light-sensitive material (photographic paper) with light beam modulated corresponding to this output image data so as to form a latent image and this image is subjected to a specified development processing and outputted as a print.

Processing conditions in both signal converting subsections 64 and 68 are set by the condition setting section 58.

The image processing to be carried out by the prescan processing section 54 and fine scan processing section 56 and its image processing conditions are set by the condition setting section 58.

This condition setting section 58 comprises a setup subsection 70, an image compressing subsection 72, a key correcting subsection 74 and a parameter coordinating subsection 76. A storage device 78 for storing compressed image data (hereinafter also referred to simply as "compressed image") of an image of a frame whose print was previously produced and information of image processing of the frame under a correspondence therebetween is connected to the parameter coordinating subsection 76. In this case, the storage device 78 functions also as data base.

Since the compressed image and the image processing information thereof are usually stored in the storage device 78 at the time of producing a simultaneous print or an original print, that is, when a so-called simultaneous print is produced, hereinafter, the printing in this case is referred to as simultaneous printing and all the printings in other cases are referred to as reprinting.

The setup subsection 70 sets up an image processing to be carried out in the prescan processing section 54 and the fine scan processing section 56.

Specifically, at the time of simultaneous printing, the setup subsection 70 constructs a density histogram, computes image characteristic quantities, such as specified % points of frequencies of the density histogram on average density, highlight (lowest density), shadow (highest density) and the like, an LATD (large area transmission density) and maximum and minimum densities of the histogram, extracts a principal part (subject) and the like from the prescanned data, sets a reading condition for the fine scan as described above, further sets image processing in accordance with the density histogram, image characteristic quantities, operator's instructions or the like, namely, determines image processing to be executed, the order thereof and the image processing condition of each image processing, and supplies these to the parameter coordinating subsection 76.

On the other hand, at the time of reprinting, the setup subsection 70 constructs the density histogram and computes the image characteristic quantities in the same way as the simultaneous printing to set a reading condition for the fine scan, determines the image processing to be executed, the order thereof and the condition thereof so as to basically reproduce the image processing of the simultaneous printing using image processing information of simultaneous printing of the frame of interest which the parameter coordinating subsection 76 has read from the storage device 78, and supplies these to the parameter coordinating subsection 76.

If printing conditions or the like between simultaneous printing and reprinting are different from each other, it is permissible to change the image processing condition and the like at the time of reprinting, if necessary. For example, if conditions relating to an image structure such as print size, resolution and the like are different between the reprint and simultaneous print, an image processing condition for image processing relating to the image structure, for example, intensity of sharpness processing, graininess suppressing processing or the like is preferably changed.

In any case of simultaneous printing and reprinting, the setup subsection 70 is not limited to setting an image processing condition from only an image data of a frame for producing a print, and it is permitted to set the image processing condition using, for example, image data of all frame of a film and image data of a plurality of frames previously processed.

The key correcting subsection 74 computes a correction amount for each of color correction, density correction, contrast (tone) correction and the like in accordance with an operator's instruction for image corrections inputted by means of the key board 18a and the mouse 18b of the manipulating unit 18 and supplies each correction amount to the parameter coordinating subsection 76.

The parameter coordinating subsection 76 receives an image processing condition or the like set by the setup subsection 70, sets the thus received image processing condition at a specified site in each of the prescan processing section 54 and fine scan processing section 56, further sets a processing condition (LUT or the like) for executing the correction set by the key correcting subsection 74 in accordance with the correction amount computed by the subsection 74 or the like, sets the thus set condition at a specified site in each of the prescan processing section 54 and the fine scan processing section 56, and then adjusts the image processing condition which has previously been set.

At the time of simultaneous printing, the parameter coordinating subsection 76 sends the compressed image (created by the image compressing subsection 72) of the frame of interest and information of image processing of that frame to the storage device 78 under a correspondence therebetween after the image processing has been established.

On the other hand, at the time of reprinting, the parameter coordinating subsection 76 retrieves the storage device 78 using the compressed image of the frame to be reprinted, assigns the priority order in high coincidence to images (candidate images) among compressed images stored in the storage device 78, reads the images up to a specified order as needed, extends them to be represented on the display 20 and reads from the storage device 78 information of image processing of the compressed image or the compressed images thus retrieved from the storage device 78 to sends it to the setup subsection 70.

These steps will be discussed in detail later.

The image compressing subsection 72 receives the prescanned data from the setup subsection 70 at simultaneous printing and, if needed, at reprinting, compresses image data of corresponding image (hereinafter also referred to simply as "image") to produce the compressed image data for a retrieval purpose and supplies it to the parameter coordinating subsection 76.

Figure 4:
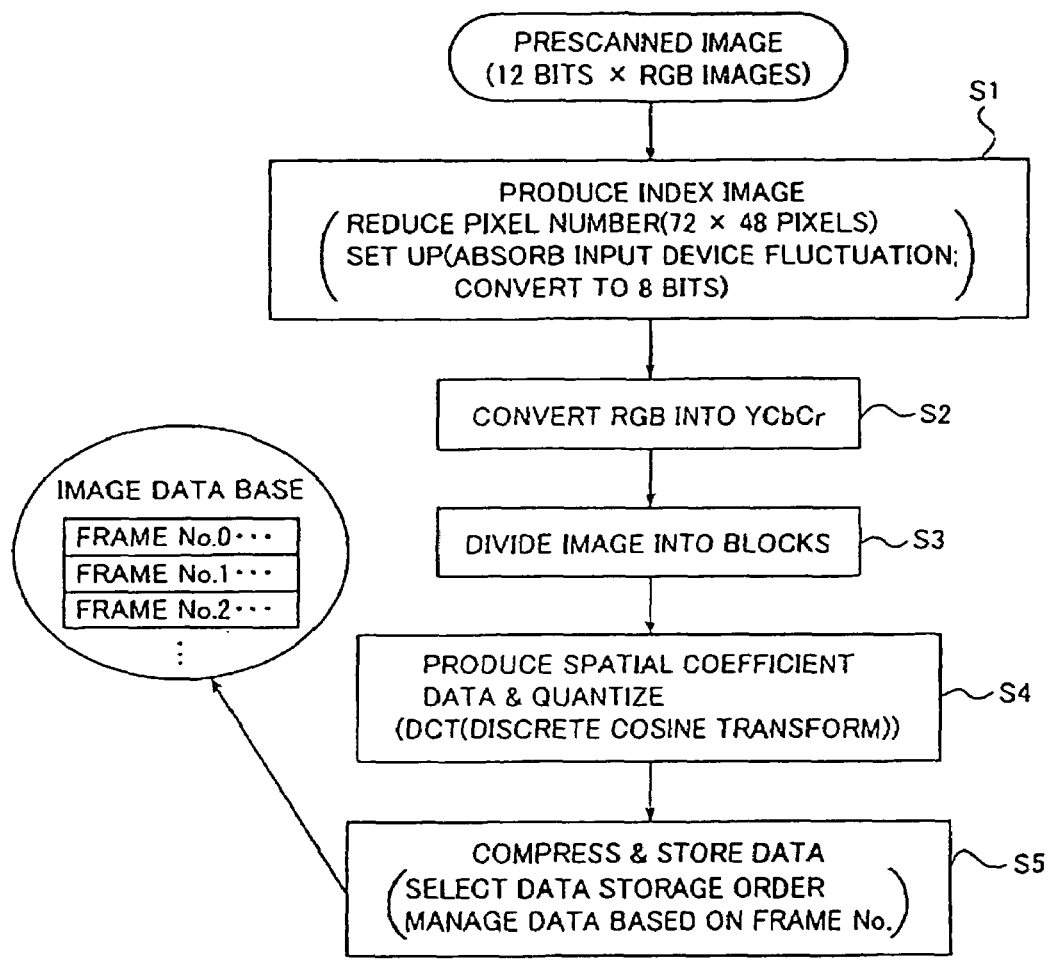
FIG. 4 is a flowchart showing an example of a method for producing a compressed image for retrieval in a retrieval system of the present invention.

The image compression method of the image data to be applied to a method of creating the compressed image for retrieval is not limited to any particular way and various known image compression methods such as Flash Pix, JPEG and the like are available. However, a following image compression method is exemplified as a favorable one:

FIG. 4 shows an example of a method of producing a compressed image for retrieval to be applied in this image compression method.

As shown in FIG. 4, in this image compression method, as the first step S1, the prescanned image comprising, for example, R, G and B images (image data) consisting of 12 bits or the like, is thinned out to produce, for example, an index image having 72×48 pixels.

The size of the index image is not limited to any particular dimension nor to the aforementioned 72×48 pixels and may appropriately be determined in accordance with the capacity of the storage device 78, retrieval accuracy to be desired and the like. As the index image becomes larger, it becomes more advantageous to the retrieval which will be described later but more disadvantageous to the capacity of the storage device 78.

In an illustrated example, as a preferred embodiment, setup is performed such that the averages of the index images become equal to each other.

Consequently, even when the prescanned data was fluctuated between the simultaneous printing and the reprinting due to fluctuation of the condition of the scanner 12, an instrumental error between scanners each used at the simultaneous printing and reprinting and so forth, the retrieval accuracy to be described later can be maintained.

It is necessary for the prescan to read securely a whole density area capable of being recorded on the film F covering from an under-exposure image to an over-exposure image so that the prescanned data has a wide dynamic range for the output density area, but, in practice, the effective density area is limited to that having some scores of percentage thereof.

Under the above circumstances, by performing such setup, the index image can be changed to be an image data having a specified area of effective density, such as 8-bit or the like.

In other words, since the inputted prescanned image inevitably includes input characteristic fluctuation of the image input machine, such as a scanner or the like, the reason why the index image is set up with an average value of the image is not only to secure characteristic which exists outside this fluctuation width but also to make an inputted prescanned image in 12 bits into an image in 8 bits.

The method of the setup is not limited to the above-described method which utilizes an average density but various other methods are available.

Among them, specifically, a method that utilizes a maximum value, a minimum value, a value representing a specified percentage of an incremental density histogram or the like is preferably exemplified. An appropriate combination of the above amounts including the aforementioned average amount may also be used.

Next, in the second step S2, the index image is converted from the image data of R, G and B to the image data of Y, Cb and Cr (this conversion is hereinafter referred to as "YCC conversion").

The YCC conversion may be performed with a known method, such as that shown in the following formulae (1):, $$Y=0.29R+0.587G+0.114B$$

$$Cb=0.167R-0.3313G-0.5B \quad (1)$$

$$Cr=0.5R-0.4187G+0.0813B$$

In general, a luminance component (Y component) shows image characteristics better than color difference components (Cb and Cr components) so that the luminance component is usually first recognized and the color difference components are succeedingly recognized to allow the image to be finally recognized.

Accordingly, it is advantageous that retrieval accuracy can be enhanced and retrieval time can be reduced by subjecting the image to YCC conversion (the thus converted image is hereinafter referred to as "YCC image") to separate the image into luminance and color difference components.

Then, in the third step S3, the thus produced YCC image is split into a plurality of blocks to divide the image into blocks.

The size of one block is not limited to any particular dimension but, for example, a size of 8×6 pixels is exemplified; in this case, if the index image is made up of the aforementioned 72×48 pixels, the index image is split into 9×6 blocks.

Succeedingly, in the fourth step S4, pixel f(x, y) of each block which has been brought about by splitting the YCC image is subjected to DCT (discrete cosine transform) to obtain a spatial coefficient (spatial coefficient data), i.e., F(u, v), of the YCC image by the following formula (2), as shown in FIG. 4.

$$F(u, v)=1/4*C(u)C(v)[\Sigma\Sigma f(x, y) \cos((2x+1) u\pi/16)\cos((2y+1) v\pi/16)] \quad (2)$$

A double summation mark $\Sigma\Sigma$ in the above formula is related with both x and y wherein x is 0 to 7 and y is also 0 to 7. Moreover, if z is 0, C(z) comes to be $½^{1/2}$, and if Z is not 0, C(Z) comes to be 1.

As shown in FIG. 4, calculations of DCT are preferably performed, as an embodiment, starting in F(0, 0) which is closest to a direct current (DC) component, advancing in a zigzag order one by one and drawing up to a high-frequency (AC) component.

The spatial coefficient data (each output term of DCT) is quantized, for example, in 8 bits.

Figure 5:
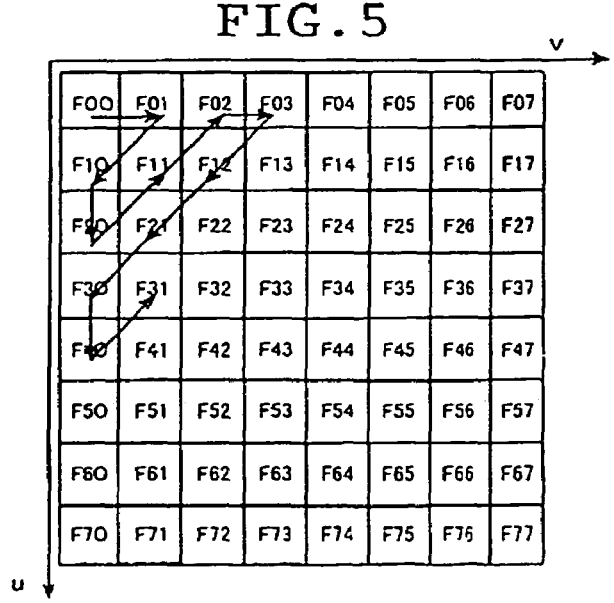
FIG. 5 is a schematic diagram explaining an example of an image compression method in the retrieval system of the present invention.

Lastly, in the fifth step S5 in FIG. 5, the thus calculated spatial coefficient F(u, v) of each block of the YCC image of the index image is set as the compressed image of the frame to be stored (or kept) in the storage device 78 together with the image processing information to be described later. In this case, spatial coefficient F(u, v) of the luminance component Y is preferably stored (calculated) up to a higher order than those of the color difference components Cb and Cr. As described above, since the luminance component is more important and, moreover, data of low order of the spatial coefficient including DC coefficient is more important than that of high order for recognition of the image, the above treatment allows the retrieval to be advantageously performed.

In the above embodiment, the spatial coefficient F(u, v) is stored in the storage device 78 as a compressed image, but the present invention is not limited to the above-described way but the spatial coefficient may further be compressed by applying a technique of the Huffman method or an arithmetic operation.

By storing the compression image in the storage device 78 in the form of the spatial coefficient, compression process can be shortened, as well as direct retrieval can be performed without performing decoding (extending) at the time of retrieval so that the period of time required for retrieval can be reduced; this is advantageous from the standpoint of production efficiency of prints. In other words, in the compression of the spatial coefficients of the YCC image in the fourth step S4 in FIG. 4, preferably, it is simple, easy to retrieve and capable of decreasing both compression time and retrieving time to refer to data which does not need to decode directly at the time of retrieving so that the above-described Huffman method, the arithmetic operation or the like is preferably not employed. However, from the standpoint of capacity of the storage device 78, it is preferably to further compress the spatial coefficient by applying those techniques so as to bring about a further compressed image. Whether such further compression is performed or not may appropriately be determined depending on capability (print production capacity to be desired) of the photoprinter 10, capacity of the storage device 78 and so forth.

In such a way, the compression image for retrieval is produced. As described above, the compression image produced by the image compressing subsection 72 is put under a correspondence with the image processing information of the frame by the parameter coordinating subsection 76 and then both are stored in the storage device 78.

As in the illustrated example, the image processing information and the compressed image are stored as data base in the storage data 78, however the present invention is not limited to the above illustration and, as long as both are under a correspondence therebetween, the data base (storage device) which stores the image processing information and another data base (storage device) which stores the compressed image may be provided independently.

Image processing information here refers to that for reproducing the same image processing of the simultaneous printing at the time of reprinting including, for example, kind of executed image processing, an order of image processing steps, an image processing condition (including parameters and relating data thereof) and the like.

As the image processing condition, various kinds of information capable of reproducing the preceding image processing (condition) in accordance with image processing to perform on the input image (data), specifically, LUT produced for the image processing, a formula of the processing, a predetermined coefficient for image processing and the like are exemplified.

For example, for an image processing to be implemented with LUT such as the gray balance adjustment or the like, LUT may be stored; for an image processing to be implemented by MTX computation such as the saturation correction, MTX expression may be stored; for the sharpness processing, sharpness gain (sharpness enhancement coefficient) may be stored; for the dodging processing, since the LUT or a processing formula is set to process the image data and then a dynamic range is compressed using the thus processed image data, this LUT or the processing formula may be stored.

If any correction was inputted when a verification or the like was performed by the operator and the image processing condition was changed in accordance with the thus inputted correction, the changed image processing condition and/or the previous condition is stored.

If correction input was executed by the operator when the verification was performed and a new processing condition such as the LUT or the like was set to be incorporated in accordance with the correction input as described above, this processing condition and the order thereof (site where the new processing condition was incorporated) are also included in the image processing information.

If LUTs, functional formulae or the like are produced for respective R, G and B colors, they are individually stored.

The storage device 78 for storing the compressed image and the image processing information thereof is not limited to any specific device but various devices are available.

For example, if a lab shop prepares customer data base, this data base may be utilized as the storage device 78. In general, if information as described above is stored permanently, the amount of information becomes huge so that this storage may be set to be within a period appropriately determined. For example, a request for reprint is, in most cases, made within a month after the simultaneous printing so that the storage period may be set to be within a month or so after the simultaneous printing has been performed.

Further, recording medium such as a floppy disk, magneto-optic recording medium, IC card or the like may be used as the storage device 78. In this case, this recording medium is given to a customer with its print and if reprint is requested, this recording medium is received from the customer together with the film F and then its information is read by a drive or the like connected to the photoprinter 10.

It is permissible to connect the storage device 78 and the processing apparatus 14 or a personal computer possessed by the lab shop to a computer communication network or the like such as LAN or WAN (wide area network) so as to access from one to the other for storing or retrieving image processing information or the like.

In this case, it is permissible to manage the retrieval information of each frame and its image processing information integrally by center system, and if a request for reprint of the film F is received, it is permissible to access a data base of another lab shop which has performed the simultaneous printing to obtain the image processing information. Further, it is also permissible to employ a personal computer possessed by a customer as the storage device 78 and store the retrieval information and image processing information at the time of the simultaneous printing and access this information at the time of reprinting so as to obtain the image processing information or the like.

As described above, image data processed by the prescan processing section 54 of the processing apparatus 14 is transmitted to the display 20 and image data processed by the fine scan processing section 56 is transmitted to the printer 16.

The printer 16 comprises a printer (printing apparatus) for exposing a light-sensitive material (photographic paper)

corresponding to supplied image data so as to form a latent image and a processor (developing apparatus) for subjecting the thus exposed light-sensitive material to a specified wet processing so as to output a finished print.

In the printer 16, for example, the light-sensitive material is cut to a predetermined length depending on print and a back print is recorded. Then, three kinds of light beams for red, green and blue exposures depending on the spectral sensitivity of the light-sensitive material are modulated corresponding to the output image data outputted from the processing apparatus 14 so as to be deflected in the main scanning direction. Then by transporting the light-sensitive material in the auxiliary scanning direction perpendicular to the main scanning direction, the light-sensitive material is scanned and exposed two-dimensionally with the aforementioned light beams so as to record a latent image and the thus scanned and exposed light-sensitive material is supplied to the processor. After receiving the light-sensitive material, the processor carries out specified wet type development processing such as color development, bleaching fixing, rinsing and the like, dries it to obtain a print, and sorts the prints by a specified unit of a single film roll and accumulates them.

By describing an operation of the photoprinter 10, the print system of the present invention will be described in detail.

First of all, a case of the simultaneous printing will be described.

Upon the simultaneous printing, an operator receiving a request for printing the film F mounts a carrier corresponding to the film F at a specified position of the scanner 12 and sets the film F at a specified position of the carrier. Then, the film F (cartridge) is set at a specified position of the carrier 30, instructions about a print size and the like are inputted and print production start is instructed.

Consequently, the F-number of the variable diaphragm 24 of the scanner 12 and the storage time of the image sensor (line CCD sensor) 34 are set corresponding to the reading condition of the prescan and after that, the carrier 30 transports the film F in the auxiliary scanning direction at a speed suitable for prescan so as to start the prescan. As described above, the film F is slit scanned as it is held in registry with a specified reading position so that a projection light is focused on the image sensor 34. An image projected to the film F is separated to red, green and blue and read photoelectrically.

The prescan or fine scan may be performed frame by frame or continuously on all frames or every specified number of frames. For simplification of description, an example of reading a single frame will be described below.

An output of the image sensor 34 is amplified by the amplifier 36, converted to digital signals by the A/D converter 38 and transmitted to the processing apparatus 14. After at the data processing section 46, the signals are subjected to a specified processing such as offset correction and converted to digital image data by the log converter 48 and then stored in the prescan memory 50.

If the prescanned data is stored in the prescan memory 50, this data is read out by the setup subsection 70 so as to construct a density histogram and compute an image characteristic quantity as described above. From that result, fine scan reading condition such as the F-number of the variable diaphragm 24 is set and transmitted to the scanner 12.

The setup subsection 70 selects an image processing to be executed on a given frame (image) depending on the density histogram, image characteristic quantity and an instruction of an operator so as to determine the order and set (compute) an image processing condition for each image processing. The set image processing condition is sent to the parameter coordinating subsection 76 and set at a specified site (hardware) of each of the prescan processing section 54 and fine scan processing section 56 by the parameter coordinating subsection 76.

The prescanned data is also sent from the setup subsection 70 to the image compressing subsection 72 where, as described above, production of the index image together wit set-up in the first step S1 in FIG. 4, conversion to YCC image in the second step S2, division of the image into blocks and DCT in the third step S3 are performed to compute the spatial coefficient F(u, v) of each block in the fourth step S4. Thereafter, the computed spatial coefficients are sent to the parameter coordinating subsection 76 as a compressed image in the fifth step S5 and stored in the storage device 78 as data base.

In a case where image verification is performed, if an image processing condition is set in the prescan processing section 54, prescanned data is read out from the prescan memory 50 and image processing is carried out corresponding to the image processing condition set by the processing subsection 62. Next, the data is supplied to the signal converting subsection 64, converted to image data corresponding to an indication on the display 20 and then prescanned image is displayed on the display 20 as simulation image.

The operator confirms (verified) an image or a result of the processing by watching a representation on the display 20 and if necessary, adjusts color, density, tone and the like with an adjustment key or the like set on the key board 18a.

The adjustment signal is sent to the key correcting subsection 74 and the key correcting subsection 74 computes a correction amount for the image processing condition corresponding to an input, and transmits this result to the parameter coordinating subsection 76.

The parameter coordinating subsection 76, in accordance with the transmitted correction amount, produces image processing condition for executing this correction as described above, sets it in a specified site of each of the processing subsection and/or corrects the image processing condition previously set in each of the processing subsections. Therefore, an image represented on the display 20 changes corresponding to the input by the operator.

If the operator confirms (verifies) that the image represented on the display 20 is appropriate, the operator indicates that matter using the key board 18a or the like.

Consequently, the image processing condition is established, so that, in this example, the fine scan is started, the scanner 12 is set to fine scan reading condition in which a F-number of the variable diaphragm 24 is set and then the carrier 30 transports the film F at a speed corresponding to the fine scan, thereby starting the fine scan.

If no verification is performed, when setting of the image processing condition in the fine scan processing section 56 by the parameter coordinating subsection 76 is terminated, the image processing condition is established so that the fine scan is started. Whether the verification is performed or not is preferably set as being selectable as mode.

The fine scan is carried out in the same manner as the prescan except that the reading conditions are those for fine scan including the stop-down value of the variable diaphragm 24 or the like; the output signal from the image sensor 34 is amplified with Amp 36, converted to digital form in the A/D converter 38, processed by the data processing section 46 in the processing apparatus 14, converted to fine scanned data in the log converter 48 and sent to the fine scan memory 52.

The fine scanned data being sent to the fine scan memory 52 is read by the fine scan processing section 56, processed under the image processing conditions finalized in the processing subsection 66, converted to output image data in the signal converting subsection 68 and subsequently outputted to the printer 16 by which a print reproducing this image data is produced.

The parameter coordinating subsection 76 sends the compressed image inputted from the image compressing subsection 72 and the established image processing information to the storage device 78 under a correspondence therebetween and then the storage device 78 stores them.

In the present invention, storage of the image processing information and compressed image in the storage device 78 is not restricted to the simultaneous print, but if a customer has complaint about an image of simultaneous print and makes a request for reprint specifying a color, density processing or the like, or if a print of a frame whose image processing information is not stored is produced, it is permissible to store the image processing information or the like at this time as image processing information of that image (frame).

On the other hand, in the photoprinter 10, reprinting and retrieval of image data base at the time of reprinting are basically performed as described below.

An operator inputs an instruction for reprinting and mounts a carried corresponding to the film F requested to be reprinted on the scanner 12. Thereafter, the film F is mounted on the carrier and then an instruction for the reprinting and the necessary information such as printing conditions, for example, a frame to be reprinted, print size and the like, are inputted through the key board 18a so that print is started.

Consequently, the carrier 30 transports the film F so that a frame to be reprinted is transported to a reading position thereby starting the prescan.

The present invention is not restricted to a case for the operator to input an instruction for simultaneous printing or reprinting. However, for example, when the storage device 78 is retrieved by using the compressed image of a frame whose print is to be reproduced, if there is no corresponding retrieval information or image processing information in the storage device 78, it is permissible to carry out the same processing as the simultaneous printing, and if there is corresponding image processing information or the like, it is permissible to carry out the same processing as the reprinting to be described below.

The prescan is performed in the same manner as the simultaneous printing. A projection light of the film F is focused on the image sensor 34 under the reading condition for the prescan, an output signal is amplified by the amplifier 36 and converted by the A/D converter 38, then converted to the prescanned data by the data processing section 46 and log converter 48 and then stored in the prescan memory 50.

When the prescanned data is stored in the prescan memory 50, the setup subsection 70 reads the prescanned data from the prescan memory 50, constructs a density histogram and computes an image characteristic quantity from the thus read prescanned data, sets the reading condition for the fine scan and then sends the thus set reading condition to the scanner 12 in the same way as the simultaneous printing. Moreover, the setup subsection 70 sends the prescanned data also to the image compressing subsection 72.

Thereafter, in the image compressing subsection 72 of the condition setting section 58, parameter coordinating subsection 76 and the storage device 78, retrieval of the image data base at the time of reprinting using reprint prescanned image set up in the setup subsection 70 of the condition setting section 58 is performed.

Figure 6:
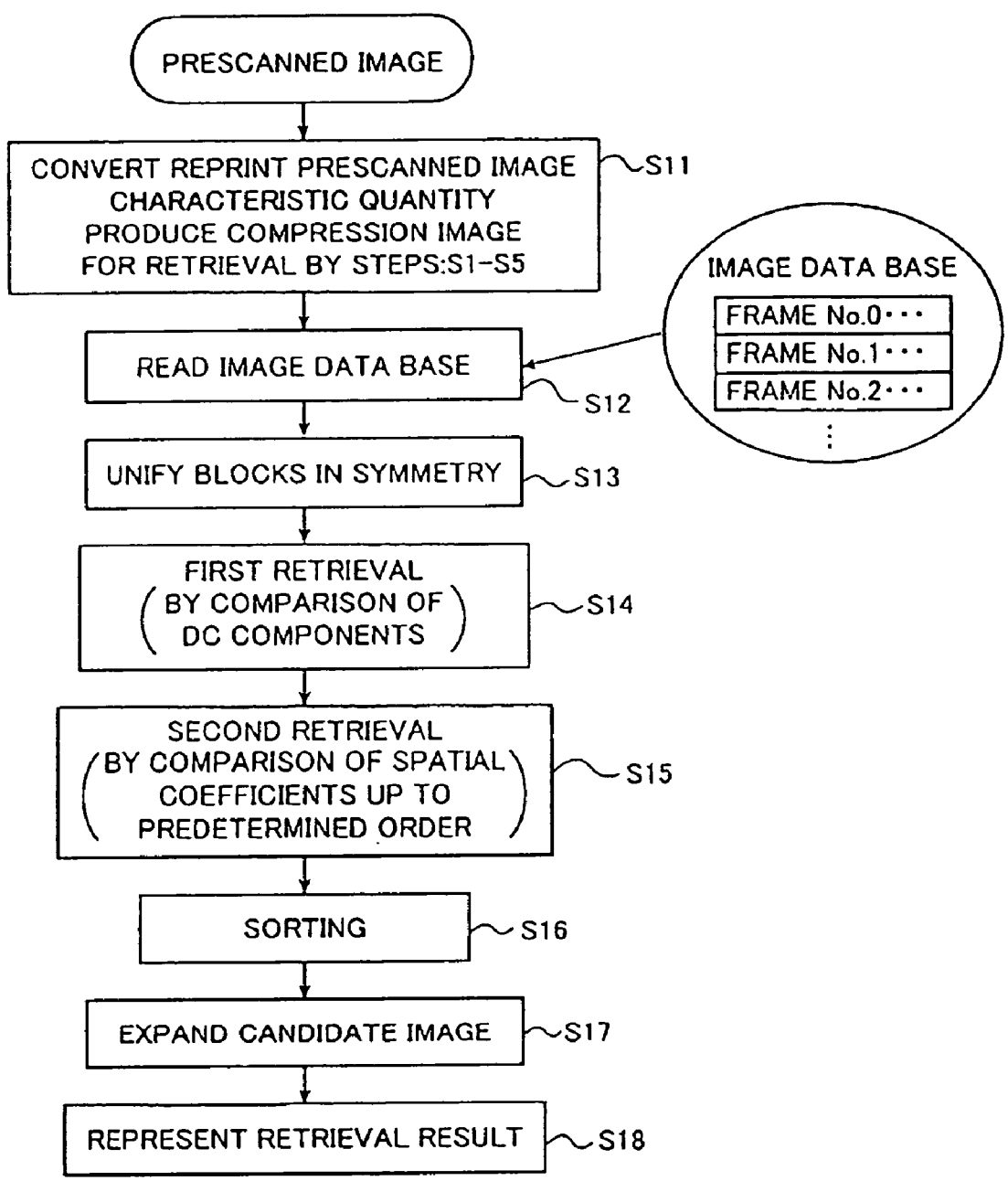
FIG. 6 is a flowchart showing an example of a retrieval method of image data base at the time of reprinting in the retrieval system of the present invention.

As shown in FIG. 6, the image compressing subsection 72, as the first step S11 for preparation of retrieval, compresses the prescanned data by performing reprinting prescanned image characteristic conversion in the same way as the image compression method of from the firs step S1 to the fifth step S5 of the creation method of compressed image for retrieval executed at the time of simultaneous printing, created the compressed image of a frame to be reprinted by compressing the prescanned data and then sends the thus created compressed image to the parameter coordinating subsection 76. The parameter coordinating subsection 76 retrieves the storage device 78 using the thus obtained compressed image in accordance with the retrieval method shown in FIG. 6 and ranks the compressed images (candidate images) which are in higher coincidence with the frame to be reprinted.

Here, the retrieval method applicable to the present invention is not limited to the retrieval method shown in FIG. 6 which, however, is preferable when the compressed image for retrieval produced by the image compression method shown in FIG. 4 is retrieved.

The retrieval method shown in FIG. 6 illustrated as a favorable method is described below.

First of all, in the step S11 of FIG. 6, the parameter coordinating subsection 76 specifies a region of the storage device 78 to be an object for retrieval by film type, film number, frame number and the like, reads prescan compressed image data base and reads at least one compressed image from the storage device (data base) 78.

Figure 7:
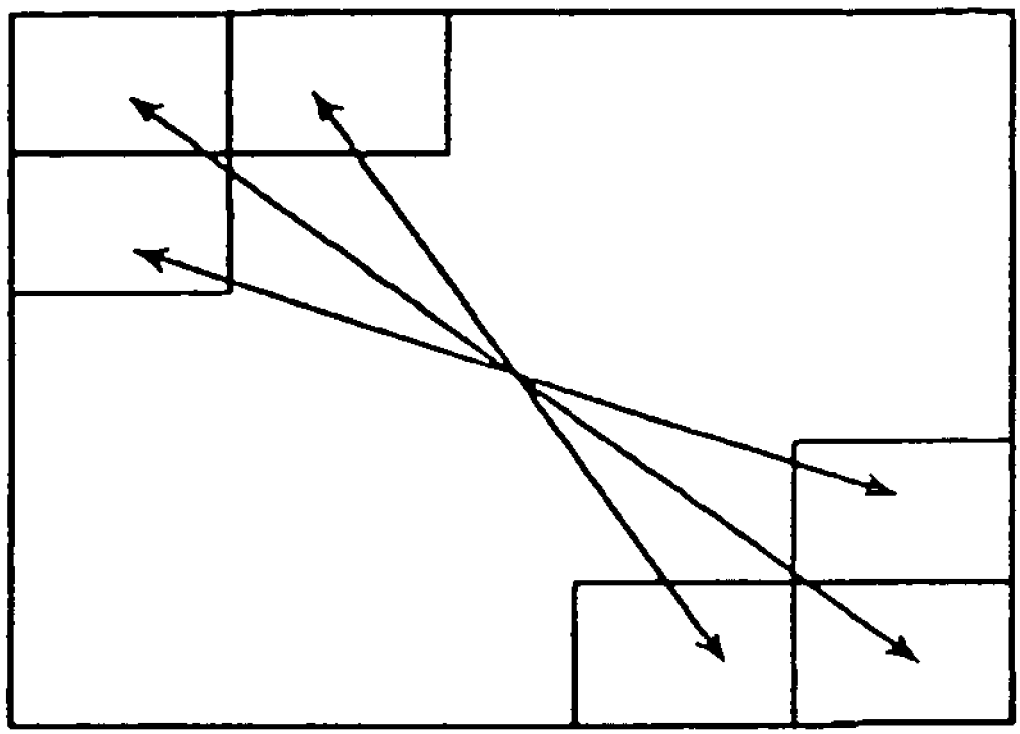
FIG. 7 is a schematic diagram explaining an example of a retrieval method in the retrieval system of the present invention.

Secondly, the parameter coordinating subsection 76, at the step S12, unifies (coordinates) data (spatial coefficients F(u, v)) of blocks positioned in a point symmetry relation with each other as shown in FIG. 7 on each of the compressed image read from the storage device (data base) 78 and the compressed image of a frame to be reprinted which was compressed in the image compressing subsection 72 and sent therefrom. Namely, take the above case for example, then it consists of 9×6 blocks; the unification of blocks in a symmetry relation with each other is executed according to the following formula as 9 blocks in X direction and 6 blocks in Y direction:

Unification Data[X,Y]
=block data[X,Y]=block data[9−(X−1), 6−(Y−1)]

Moreover, as shown in FIG. 6, a key such as a film number, a frame number, a film type or the like may be imparted to compressed images at the time of simultaneous printing, if necessary, so as to preferably narrow down to and read the compressed images as an object to be processed with an aid of the imparted information. If the key for narrowing down to the compressed image as an object to be processed does not exist, it is permissible for at least one prescanned compressed image stored in the storage device (data base) 78 to be appropriately read.

When the film F is read with the scanner 12, an opportunity may occur in which, depending on a loading direction of the film F to the scanner 12, namely, whether the film F is loaded from a small-numbered frame or a large-numbered frame, an image at the simultaneous printing can be turned upside down and accordingly the right and left sides thereof are also reversed at the reprinting. In this case, even if images at the simultaneous print and reprint are the same, the compressed image data (its array or the like) becomes totally different so that an accurate retrieval can not be performed.

Contrary to this case, by splitting the image into blocks and then unifying blocks which are positioned in a point symmetry relation with each other, as described above, compressed image data at the times of simultaneous printing and reprinting can be coincided with each other regardless of the loading direction of the film whereupon a stable and accurate retrieval can be performed.

Next, a retrieval is performed. The retrieval may be performed in one step, but retrieval in two steps is illustrated as a favorable method below.

At first, in the step S13, a first retrieval is performed such that a compressed image of a frame to be reprinted and compressed images read from the storage device 78 are compared with each other of their characteristic quantities on DC components (luminance components), namely, the spatial coefficients of Y components in this embodiment, up to a specified order on a unified block basis.

Of the images selected by the first retrieval, in the step S14, AC components, namely, spatial coefficients of Cb and Cr which are color difference components in this embodiment, are compared up to a specified order on a unified block basis and, in the next step S15, ranking (sorting) is performed starting from the compressed image (candidate image) which is in high coincidence with the compressed image of the frame to be reprinted.

Alternatively, in place of the above-described first and second retrievals, a two-step retrieval may be performed either in a manner that, after the above-described first retrieval has been performed, the characteristic quantity of the luminance component is retrieved to a higher order than the first retrieval, or in another manner that, after the above-described first retrieval has been performed, both color difference component and the above-described luminance component are retrieved up to the higher order.

A ranking operation in the step S15 is exemplified which, for example, comprises the steps of:

computing an absolute value of difference between characteristic quantities of a compressed image in a frame to be reprinted and each of those read from the storage device 78 on a unified block basis;

computing weight of each block so that the difference of 0 comes to be the maximum value of 1;

multiplying all of the thus computed weights of the unified blocks to obtain each product on a compressed image basis; and ranking compressed images in a manner that a compressed image whose product is closest to 1 has the highest coincidence and, therefore, the compressed image comes first in order.

In the present invention, the compressed image which has the highest coincidence may be determined as the compressed image at the time of the simultaneous printing for the frame to be reprinted (hereinafter called as "image to be processed") or, when the multiplication value of the compressed image which was determined to have the highest coincidence exceeds a threshold value, the image may be determined as the image to be processed or, in another case, a specified number of compressed images starting from the highest ranking in coincidence are represented on a display 20 to allow the operator to select the image to be processed. In still another case, the compressed images may be arranged in a manner that any one of the above-described cases may be appropriately selected.

In a case in which the image having the highest coincidence does not exceed the threshold value when the image to be processed is determined using the threshold value, or in another case in which the image to be processed is unable to be selected from the display representation, the same processing as the simultaneous printing described above may be performed.

When the image is represented on the display 20, the parameter coordinating subsection 76, in the step S16, expands candidate images in the order of the compressed image with high coincidence among compressed images read from the storage device 78. Namely, in the step S16, the compressed image of the candidate image, that is, the spatial coefficient (DCT output term) is subjected to an inverse DCT conversion to determine pixel data f(x, y) of YCC image in accordance with the following formula (3):

$$f(x,y)=1/4* C(u)C(v) [\Sigma\Sigma F(u,v)\cos((2x+1)u\pi/16)\cos((2y+1)v\pi/16)] \quad (3)$$

A double summation mark Σ of the above formula is related with both of u and v, wherein u is 0 to 7 and v is 0 to 7.

Moreover, if z is 0, C(z; comes to be $½^{1/2}$, if Z is not 0, C(Z) comes to be 1.

Subsequently, the obtained YCC image is subjected to a matrix conversion which is an inverse of the aforementioned YCC conversion (the above formula (1)) to be converted into R, G and B images data.

In the last, in the step S17, the parameter coordinating subsection 76 supplies the image data obtained as a result of retrieval to the signal converting subsection 64 where the image data are subjected to data conversion to represent the image as a result of retrieval on the display 20.

After the image as an object to be processed was selected from the compressed images stored in the storage device 78 in the manner described above, the parameter coordinating subsection 76 reads information of image processing which belongs to or is stored corresponding to the thus selected image as an object to be processed from the storage device 78 and sends the thus read information to the setup subsection 70.

The setup subsection 70 sets an image processing condition or the like from the computed image characteristic quantity or the like and the image processing information inputted from the parameter coordinating subsection 76 and then sends the thus set image processing condition to the parameter coordinating subsection 76. Such image processing is set so as to basically reproduce image processing at the time of simultaneous printing.

The parameter coordinating subsection 76 sets the image processing condition or the like in a specified position of the fine scan processing section 56.

In this embodiment, by setting the image processing condition in the fine scan processing section 56, the image processing condition is established so that the fine scan is started. Alternatively, if necessary, verification may be performed in the same way as the simultaneous printing before the image processing condition is established.

Basically, The fine scan is basically performed in the same manner as the simultaneous printing. The scanner 12 is operated according to the supplied reading condition for the fine scan and the output signal from the image sensor 34 is amplified by the amplifier 36, converted to digital signal by the A/D converter 38, processed by the data processing section 46 of the processing apparatus 14, then converted to fine scanned data by the log converter 48, outputted to the fine scan memory 52 and stored therein.

Next, the fine scanned data is read from the fine scan memory 52 and processed under the processing condition set by the processing subsection 66. This data is converted to output image data for recording by the signal converting subsection 68, and outputted to the printer 16, in which a print is produced from this data.

The image reproduced by this reprinting is basically an image obtained by carrying out the same image processing as the simultaneous printing under the same image processing condition. Therefore, this is the image whose color and density are equal to the simultaneous print image.

In other words, according to the present invention, information relating to the image to be processed can be advantageously retrieved from the data base or the like using the compressed image available from the storage device 78. Moreover, by utilizing the compressed image, small storage capacity is capable of handling a large number of objects to be retrieved.

According to the image processing apparatus of the present invention, image processing information at the time of simultaneous printing is appropriately read by utilizing the above-described retrieval method; the image processing at the time of the simultaneous printing can be reproduced; hence the coincidence of images at the simultaneous print and reprint can be achieved. Therefore, even if the film, such as a 135-size film, does not have an individual ID number and is cut into pieces after the simultaneous printing has been done, the coincidence of images at the simultaneous print and reprint can be achieved.

In the above described embodiments, the retrieval system and the image processing apparatus of the present invention have been described in a manner that the parameter coordinating subsection 76 compresses the prescanned image in the image compressing subsection 72, the obtained compressed image of the prescanned image and information of the image processing of the image processing condition and the like of the compressed image thereof are stored under a correspondence therebetween as data base in the storage device 78, the compressed image stored in the storage device 78 is used for retrieving of itself and information of image processing of the retrieved compressed image is read to be used as a reading condition, an image processing condition of the fine scanned image or the like. However, the present invention is not limited to the above embodiments but may not include the image compressing subsection 72 allowing the compressed image of the prescanned image produced outside in a separate manner to be stored in the storage device 78 and the thus stored compressed image to be retrieved of itself or may not store information of the image processing of the compressed image under a correspondence with the compressed image allowing only the compressed image to be retrieved.

In the foregoing embodiments, the compressed image is created by compressing the prescanned image (data), but the present invention is not limited to the above. The compressed image may be created by compressing the fine scanned image (data).

In the present invention, the output image data may be outputted to various kinds of storage mediums such as a floppy disk, MO disk (magnetic recording disk), CD-ROM as well as the printer 16 and stored as an image file.

Moreover, information of the image as an object to be retrieved is not limited to information of image processing and, for example, image data, image characteristic quantity, print information (number, size or the like) and so forth are exemplified.

While the retrieval system and the image processing apparatus of the present invention have been described in detail above, it should be noted that the present invention is by no means limited to the embodiments described above and that various improvements and modifications can be made without departing from the scope and spirit of the invention.

As described in detail on the foregoing pages, according to the retrieval system of the present invention, the image data of the image can be easily made to data base as the compressed image data and, moreover, the compressed image data stored in the data base or the like can be retrieved in an easy and rapid manner.

Moreover, according to the retrieval system of the present invention, in addition to the above effect, the image data of the image can be compressed imagewise as the compressed image data which can easily be make to data base.

Moreover, according to the retrieval system of the present invention, in addition to the above effects, information of the image processing of the image and the image data thereof can be made to data base under a correspondence therebetween and, still moreover, information of the image such as image processing information or the like stored in the data base or the like can advantageously be retrieved using the compressed image.

Moreover, according to the image processing apparatus of the invention, the image of simultaneous print which is consistent with that of reprint can easily and rapidly be retrieved and also the reprint reproducing of the image having the color and density in consistent with the color and density of the image reproduced by a simultaneous printing can be output in a stable manner.

What is claimed is:

1. A retrieval system for retrieving an image from an image data base, comprising:
    a storage device for storing compressed image data of said image, said storage device including the image data base;
    a retrieval device for retrieving said image while said compressed image data is in a compressed state; and
    a compression device for compressing image data of said image to produce said compressed image data, wherein said compression device performs normalization for correcting fluctuation of said image data in reading prior to compression of said image data to perform setup of said image data to achieve a predetermined reference value of the compressed image data,
    wherein said storage device stores image data of said image after said image is split into a plurality of regions, and
    wherein said retrieval device performs retrieval of said compressed image data after said image data in the regions, which are in a point symmetry relation with each other about a center of said image, are added.

2. The retrieval system according to claim 1, wherein said storage device stores said compressed image data of said image and information of said image under a correspondence therebetween.

3. The retrieval system according to claim 1, wherein said information of a corresponding image is read from said data base in accordance with a result retrieved by said retrieval device.

4. The retrieval system according to claim 1, wherein said compressed image data comprises spatial coefficients of a luminance signal and a color difference signal.

5. The retrieval system according to claim 4, wherein said retrieval device performs at least one of retrieval by comparing the spatial coefficients of the luminance signal up to a specified order with each other to select objects to be retrieved and thereafter by comparing the spatial coefficients of the color difference signal of the thus selected objects to be retrieved to another specified order with each other, and retrieval by comparing the spatial coefficients of the luminance signal up to a higher order than the previously specified order with each other.

6. The retrieval system according to claim 1, wherein said retrieval device performs priority ranking of said compressed image data to be candidates.

7. The retrieval system according to claim 6, wherein, after said compressed image data is extended, one or more images are represented as visible images in accordance with the result of said priority ranking.

8. The retrieval system according to claim 2, wherein said information of said image is at least one of image data of the image of interest and information of image processing to which the image of interest is subjected.

9. The retrieval system according to claim 1, wherein said normalization of said image data is performed so that averages of the compressed image data of images becomes equal to each other.

10. A retrieval system for retrieving an image from an image data base, comprising:
  a storage device for storing compressed image data of said image, said storage device including the image data base; and
  a retrieval device for retrieving said image while said compressed image data is in a compressed state, wherein
  said storage device stores compressed image data of split images in which said image is split into a plurality of regions and wherein said retrieval device performs retrieval of said image using said compressed data after said compressed image data of said split images in regions which are in a point symmetry relation with each other about the center of said image are added.

11. The retrieval system according to claim 10, further comprising a compression device for compressing image data of said image to produce said compressed image data.

12. An image processing apparatus comprising:
  an image processing device for subjecting an image or image data thereof to image processing;
  a setting device for setting said image processing which said image processing device performs in accordance with said image or the image data thereof;
  a storage device for storing compressed image data of said image or said image data thereof and information of said image processing to which said image or the image data thereof corresponding to said compressed image data is subjected under a correspondence therebetween, wherein said storage device stores compressed image data of split images in which said image is split into a plurality of regions; and
  a retrieval device for retrieving said image stored in said storage device while said compressed image data is in a compressed state to read said information of the image processing corresponding to the image of interest, wherein said retrieval device performs retrieval of said image using said compressed image data after said compressed image data of said split images in regions which are in a point symmetry relation with each other about the center of said image are added.

13. The image processing apparatus according to claim 12, further comprising a compression device for compressing said image data of said image to produce said compressed image data.

14. A retrieval system for retrieving an image from an image data base, comprising:
  a storage device for storing compressed image data of said image, said storage device including the image data base;
  a retrieval device for retrieving said image while said compressed image data is in a compressed state; and
  a compression device for compressing image data of said image to produce said compressed image data, wherein said compression device performs normalization for correcting fluctuation of said image data in reading to perform setup of said image data to achieve a predetermined reference value of the compressed image data;
  wherein said fluctuation of said image data is due to at least one of (i) changes of light when scanning said image, (ii) changes in reading positions when scanning said image, (iii) changes in a physical condition or reading position of a photographic print when scanning the photographic print, or (iv) changes in said image data made by altering image data from a digital camera.

15. The retrieval system according to claim 14, said fluctuation of said image data being due to changes of light when scanning said image or changes in reading positions when scanning said image.

16. The retrieval system according to claim 14, said fluctuation of said image data being due to changes in a physical condition or reading position of a photographic print when scanning the photographic print.

17. The retrieval system according to claim 14, said fluctuation of said image data being due to changes in said image data made by altering image data from a digital camera.

18. An image processing apparatus comprising:
  an image processing device for subjecting an image or image data thereof to image processing;
  a setting device for setting said image processing which said image processing device performs in accordance with said image or the image data thereof;
  a storage device for storing compressed image data of said image or said image data thereof and information of said image processing to which said image or the image data thereof corresponding to said compressed image data is subjected under a correspondence therebetween;
  a retrieval device for retrieving said image stored in said storage device while said compressed image data is in a compressed state to read said information of the image processing corresponding to the image of interest; and
  a compression device for compressing image data of said image to produce said compressed image data, wherein said compression device performs normalization for correcting fluctuation of said image data in reading to perform setup of said image data to achieve a predetermined reference value of the compressed image data;
  wherein said fluctuation of said image data is due to at least one of (i) changes of light when scanning said image, (ii) changes in reading positions when scanning said image, (iii) changes in a physical condition or reading position of a photographic print when scanning the photographic print, or (iv) changes in said image data made by altering image data from a digital camera.

19. The image processing apparatus according to claim 18, said fluctuation of said image data being due to changes of light when scanning said image or changes in reading positions when scanning said image.

20. The image processing apparatus according to claim 18, said fluctuation of said image data being due to changes in a physical condition or reading position of a photographic print when scanning the photographic print.

21. The image processing apparatus according to claim 18, said fluctuation of said image data being due to changes in said image data made by altering image data from a digital camera.

* * * * *